United States Patent
Gormley et al.

(10) Patent No.: US 9,667,627 B2
(45) Date of Patent: *May 30, 2017

(54) AIRPORT SECURITY CHECK SYSTEM AND METHOD THEREFOR

(71) Applicant: SITA Information Networking Computing Ireland Limited, Letterkenny (IE)

(72) Inventors: Michael John Gormley, Honolulu, HI (US); Renaud Irminger, Letterkenny (IE)

(73) Assignee: SITA Information Networking Computing Ireland Limited, Letterkenny (IE)

( * ) Notice: Subject to any disclaimer, the term of this patent is extended or adjusted under 35 U.S.C. 154(b) by 157 days.

This patent is subject to a terminal disclaimer.

(21) Appl. No.: 14/738,385

(22) Filed: Jun. 12, 2015

(65) Prior Publication Data

US 2015/0281232 A1  Oct. 1, 2015

Related U.S. Application Data

(63) Continuation of application No. 13/829,185, filed on Mar. 14, 2013, now Pat. No. 9,087,204.

(Continued)

(30) Foreign Application Priority Data

Nov. 28, 2012  (GB) .................................. 1221469.8

(51) Int. Cl.
*G06F 21/00* (2013.01)
*H04L 29/06* (2006.01)
(Continued)

(52) U.S. Cl.
CPC ........ *H04L 63/0861* (2013.01); *G06F 21/602* (2013.01); *G06F 21/6245* (2013.01);
(Continued)

(58) Field of Classification Search
CPC ............. H04L 63/0861; H04L 63/0492; H04L 63/0807; H04L 9/0866; H04L 9/0897;
(Continued)

(56) References Cited

U.S. PATENT DOCUMENTS 4,821,118 A  4/1989 Lafreniere
5,270,921 A  12/1993 Hornick
(Continued)

FOREIGN PATENT DOCUMENTS

CN  101436185 A  5/2009
DE  10357831 A1  7/2005
(Continued)

OTHER PUBLICATIONS

Aircom Server Administrator Guide, SITA Airline Telecommunications and Information Services, Feb. 19, 2013, pp. 1-280.
(Continued)

*Primary Examiner* — John B King
(74) *Attorney, Agent, or Firm* — Morris, Manning & Martin, LLP; Daniel E. Sineway, Esq.; R. Lee Strasburger, Jr., Esq.

(57) ABSTRACT

A decryption system for decrypting user identification information encrypted on a storage device associated with a user identity document is disclosed. The system comprises: a server configured to collect user identity document data from the user and to construct a token including the user identity document data encoded in a machine readable form; a key construction unit communicatively coupled to a reader configured to read the data from the token and configured to read the data encoded on the storage device. The key
(Continued)

construction unit uses the user identity document data read from the token to construct a key which enables the identity document reader to decrypt the user identification information stored on the storage device.

20 Claims, 6 Drawing Sheets

Related U.S. Application Data

(60) Provisional application No. 61/622,213, filed on Apr. 10, 2012.

(51) Int. Cl.
| | |
|---|---|
| *G06F 21/62* | (2013.01) |
| *G07F 7/08* | (2006.01) |
| *H04L 9/08* | (2006.01) |
| *G06Q 20/32* | (2012.01) |
| *G07F 7/12* | (2006.01) |
| *G06F 21/60* | (2013.01) |
| *G07C 9/00* | (2006.01) |
| *G06K 9/00* | (2006.01) |

(52) U.S. Cl.
CPC ..... *G06K 9/00261* (2013.01); *G06K 9/00288* (2013.01); *G06K 9/00469* (2013.01); *G06Q 20/3278* (2013.01); *G07C 9/00007* (2013.01); *G07F 7/08* (2013.01); *G07F 7/12* (2013.01); *H04L 9/08* (2013.01); *H04L 9/0866* (2013.01); *H04L 9/0897* (2013.01); *H04L 63/0492* (2013.01); *H04L 63/0807* (2013.01)

(58) Field of Classification Search
CPC ........... G06K 9/00469; G06K 9/00288; G06K 9/00261; G06F 21/6245; G06F 21/602; G07C 9/00007; G07F 7/08; G07F 7/12; G06Q 20/3278
USPC .......................................................... 726/10
See application file for complete search history.

(56) References Cited

U.S. PATENT DOCUMENTS

| | | | |
|---|---|---|---|
| 5,918,209 | A | 6/1999 | Campbell et al. |
| 6,108,636 | A | 8/2000 | Yap et al. |
| 6,112,185 | A | 8/2000 | Walker et al. |
| 6,158,658 | A | 12/2000 | Barclay |
| 6,192,416 | B1 | 2/2001 | Baxter |
| 6,367,016 | B1 | 4/2002 | Lambert et al. |
| 6,473,704 | B1 | 10/2002 | Ito et al. |
| 6,661,340 | B1 | 12/2003 | Saylor et al. |
| 6,695,203 | B2 | 2/2004 | Iki et al. |
| 6,698,653 | B1* | 3/2004 | Diamond ........... G07C 9/00087 235/375 |
| 6,757,712 | B1 | 6/2004 | Bastian et al. |
| 6,760,778 | B1 | 7/2004 | Nelson et al. |
| 6,869,023 | B2 | 3/2005 | Hawes et al. |
| 7,035,828 | B2 | 4/2006 | Ketonen et al. |
| 7,212,978 | B2 | 5/2007 | Kowal et al. |
| 7,258,276 | B2 | 8/2007 | Linton et al. |
| 7,327,262 | B2 | 2/2008 | Motteram et al. |
| 7,421,319 | B2 | 9/2008 | Stefani |
| 7,440,967 | B2 | 10/2008 | Chidlovskii |
| 7,454,203 | B2 | 11/2008 | Levitan |
| 7,483,696 | B1 | 1/2009 | Mitchell |
| 7,486,960 | B2 | 2/2009 | Brady, Jr. et al. |
| 7,539,985 | B2 | 5/2009 | Marvin |
| 7,571,206 | B2 | 8/2009 | Koning et al. |
| 7,607,080 | B2 | 10/2009 | Heuer et al. |
| 7,664,672 | B1 | 2/2010 | Walker et al. |
| 7,668,873 | B2 | 2/2010 | Davis et al. |
| 7,685,009 | B2 | 3/2010 | Halavais et al. |
| 7,702,328 | B2 | 4/2010 | Lemond et al. |
| 7,720,724 | B2 | 5/2010 | Kurashige |
| 7,739,292 | B2 | 6/2010 | Falk et al. |
| 7,786,899 | B2 | 8/2010 | Baker et al. |
| 7,805,523 | B2 | 9/2010 | Mitchell et al. |
| 7,870,101 | B2 | 1/2011 | Hubbard et al. |
| 7,882,137 | B2 | 2/2011 | Lepman |
| 7,907,067 | B2 | 3/2011 | Baker et al. |
| 7,907,545 | B2 | 3/2011 | Ric |
| 7,949,335 | B2 | 5/2011 | Stefani et al. |
| 7,954,712 | B2 | 6/2011 | Babcock et al. |
| 8,001,519 | B2 | 8/2011 | Conallen et al. |
| 8,058,972 | B2 | 11/2011 | Mohanty |
| 8,087,583 | B2 | 1/2012 | Hawes |
| 8,090,603 | B2 | 1/2012 | Payne et al. |
| 8,117,051 | B2 | 2/2012 | Sauvage et al. |
| 8,160,759 | B2 | 4/2012 | Baker et al. |
| 8,165,809 | B1 | 4/2012 | Baker et al. |
| 8,170,535 | B1 | 5/2012 | Lopes et al. |
| 8,195,151 | B2 | 6/2012 | Cerra, II et al. |
| 8,214,144 | B2 | 7/2012 | Baker et al. |
| 8,229,458 | B2 | 7/2012 | Busch |
| 8,296,281 | B2 | 10/2012 | Baker et al. |
| 8,332,136 | B2 | 12/2012 | Baker et al. |
| 8,606,508 | B2 | 12/2013 | Baker et al. |
| 8,671,009 | B1 | 3/2014 | Coley et al. |
| 8,700,236 | B1 | 4/2014 | Berman |
| 8,713,661 | B2 | 4/2014 | Vysogorets et al. |
| 2002/0138184 | A1 | 9/2002 | Kipersztok et al. |
| 2002/0138625 | A1 | 9/2002 | Bruner et al. |
| 2002/0160773 | A1 | 10/2002 | Gresham et al. |
| 2003/0034390 | A1 | 2/2003 | Linton et al. |
| 2003/0048471 | A1 | 3/2003 | Lundgren |
| 2003/0093187 | A1 | 5/2003 | Walker |
| 2003/0111530 | A1 | 6/2003 | Iki et al. |
| 2003/0130769 | A1 | 7/2003 | Farley et al. |
| 2003/0146871 | A1 | 8/2003 | Karr et al. |
| 2003/0150922 | A1 | 8/2003 | Hawes |
| 2003/0215114 | A1* | 11/2003 | Kyle ..................... G06F 21/32 382/115 |
| 2003/0220116 | A1 | 11/2003 | Sagefalk et al. |
| 2004/0030855 | A1 | 2/2004 | Takeuchi et al. |
| 2004/0039617 | A1 | 2/2004 | Maycotte et al. |
| 2004/0128193 | A1 | 7/2004 | Brice et al. |
| 2004/0249836 | A1 | 12/2004 | Reynders et al. |
| 2005/0004919 | A1 | 1/2005 | Green et al. |
| 2005/0033666 | A1 | 2/2005 | Kurashige |
| 2005/0071206 | A1 | 3/2005 | Berge |
| 2005/0228702 | A1 | 10/2005 | Fairbanks et al. |
| 2005/0258247 | A1 | 11/2005 | Hawes |
| 2006/0004781 | A1 | 1/2006 | Burgel et al. |
| 2006/0053056 | A1 | 3/2006 | Alspach-Goss et al. |
| 2006/0075934 | A1 | 4/2006 | Ram |
| 2006/0085451 | A1 | 4/2006 | Pal et al. |
| 2006/0095434 | A1 | 5/2006 | McCullough et al. |
| 2006/0097046 | A1 | 5/2006 | Baru Fassio et al. |
| 2006/0173680 | A1 | 8/2006 | Verhasselt et al. |
| 2006/0206246 | A1 | 9/2006 | Walker |
| 2006/0234700 | A1 | 10/2006 | Funderburk et al. |
| 2006/0238384 | A1 | 10/2006 | Hess et al. |
| 2006/0259456 | A1 | 11/2006 | Falk et al. |
| 2006/0277231 | A1 | 12/2006 | Kral et al. |
| 2006/0288021 | A1 | 12/2006 | Kojima |
| 2007/0055416 | A1 | 3/2007 | Allen |
| 2007/0072590 | A1 | 3/2007 | Levitan |
| 2007/0111725 | A1 | 5/2007 | Kauffman et al. |
| 2007/0127460 | A1 | 6/2007 | Wilber et al. |
| 2007/0133487 | A1 | 6/2007 | Wang et al. |
| 2007/0149216 | A1 | 6/2007 | Misikangas |
| 2007/0157078 | A1 | 7/2007 | Anderson |
| 2007/0198314 | A1 | 8/2007 | Andrew et al. |
| 2007/0203796 | A1 | 8/2007 | Riggs |
| 2007/0222595 | A1 | 9/2007 | Motteram et al. |
| 2007/0233617 | A1 | 10/2007 | Gillespie |
| 2007/0244766 | A1 | 10/2007 | Goel |
| 2007/0250356 | A1 | 10/2007 | Douglas |
| 2007/0250718 | A1* | 10/2007 | Lee ..................... H04L 63/0861 713/186 |

(56) References Cited

U.S. PATENT DOCUMENTS

| | | |
|---|---|---|
| 2007/0265881 A1 | 11/2007 | El Eman et al. |
| 2007/0273514 A1 | 11/2007 | Winand et al. |
| 2008/0010005 A1 | 1/2008 | Small et al. |
| 2008/0015926 A1 | 1/2008 | Marcken |
| 2008/0027765 A1 | 1/2008 | Gunn et al. |
| 2008/0027955 A1 | 1/2008 | May et al. |
| 2008/0046298 A1 | 2/2008 | Ben-Yehuda et al. |
| 2008/0065480 A1 | 3/2008 | Baker et al. |
| 2008/0070517 A1 | 3/2008 | Brady et al. |
| 2008/0091445 A1 | 4/2008 | Mihic |
| 2008/0099552 A1 | 5/2008 | Grillion |
| 2008/0140226 A1 | 6/2008 | Ganev |
| 2008/0140434 A1 | 6/2008 | O'Brien |
| 2008/0224823 A1 | 9/2008 | Lawson et al. |
| 2008/0229228 A1 | 9/2008 | Cohen |
| 2009/0010200 A1 | 1/2009 | Lauer et al. |
| 2009/0015398 A1 | 1/2009 | Bhogal et al. |
| 2009/0030781 A1 | 1/2009 | Mehta et al. |
| 2009/0033491 A1 | 2/2009 | Saunders |
| 2009/0063219 A1 | 3/2009 | Raufaste et al. |
| 2009/0070841 A1 | 3/2009 | Buga et al. |
| 2009/0081947 A1 | 3/2009 | Margis |
| 2009/0112473 A1 | 4/2009 | Lu et al. |
| 2009/0164500 A1 | 6/2009 | Mathur et al. |
| 2009/0182590 A1 | 7/2009 | Ashby et al. |
| 2009/0187494 A1 | 7/2009 | Heath |
| 2009/0196201 A1 | 8/2009 | Ric |
| 2009/0248457 A1 | 10/2009 | Munter et al. |
| 2009/0256675 A1 | 10/2009 | Kerr |
| 2009/0259549 A1 | 10/2009 | Winand et al. |
| 2009/0287513 A1 | 11/2009 | Anderson et al. |
| 2009/0288123 A1 | 11/2009 | Havlovick et al. |
| 2009/0307020 A1 | 12/2009 | Viale et al. |
| 2009/0310530 A1 | 12/2009 | Cerra, II et al. |
| 2009/0313601 A1 | 12/2009 | Baird et al. |
| 2010/0027461 A1 | 2/2010 | Bothorel |
| 2010/0030591 A1 | 2/2010 | Viard et al. |
| 2010/0065632 A1 | 3/2010 | Babcock et al. |
| 2010/0076795 A1 | 3/2010 | Steir et al. |
| 2010/0076826 A1 | 3/2010 | Bayne |
| 2010/0078475 A1 | 4/2010 | Lin et al. |
| 2010/0102934 A1 | 4/2010 | Guichard |
| 2010/0138667 A1* | 6/2010 | Adams .................. G06F 21/32 713/186 |
| 2010/0159871 A1 | 6/2010 | Tester |
| 2010/0190510 A1 | 7/2010 | Maranhas et al. |
| 2010/0191782 A1 | 7/2010 | Brzozowski |
| 2010/0198628 A1 | 8/2010 | Rayner |
| 2010/0205448 A1 | 8/2010 | Tarhan et al. |
| 2010/0245034 A1 | 9/2010 | D'Oliveiro et al. |
| 2010/0268656 A1 | 10/2010 | Teicher |
| 2010/0332358 A1 | 12/2010 | Owens |
| 2011/0004832 A1 | 1/2011 | Canal et al. |
| 2011/0018769 A1 | 1/2011 | Misikangas et al. |
| 2011/0028160 A1 | 2/2011 | Roeding et al. |
| 2011/0119183 A1 | 5/2011 | Berman |
| 2011/0227737 A1 | 9/2011 | Kamins |
| 2012/0035965 A1 | 2/2012 | Maguire et al. |
| 2012/0042263 A1 | 2/2012 | Rapaport et al. |
| 2012/0042371 A1 | 2/2012 | Gur et al. |
| 2012/0075168 A1 | 3/2012 | Osterhout et al. |
| 2012/0101885 A1 | 4/2012 | Lee et al. |
| 2012/0123844 A1 | 5/2012 | Fano et al. |
| 2012/0129546 A1 | 5/2012 | Yang et al. |
| 2012/0200390 A1 | 8/2012 | Saravanan |
| 2012/0203578 A1 | 8/2012 | Baggett et al. |
| 2012/0284108 A1 | 11/2012 | Fontana et al. |
| 2013/0069985 A1 | 3/2013 | Wong et al. |
| 2013/0141313 A1 | 6/2013 | Zhou et al. |
| 2013/0211864 A1 | 8/2013 | Sanderson et al. |
| 2013/0234849 A1 | 9/2013 | Gupta et al. |
| 2013/0267255 A1 | 10/2013 | Liu et al. |
| 2013/0295966 A1 | 11/2013 | Dingler et al. |
| 2013/0297103 A1 | 11/2013 | Baker et al. |
| 2013/0314257 A1 | 11/2013 | Macrae et al. |
| 2013/0325526 A1 | 12/2013 | Tyler |
| 2014/0006070 A1 | 1/2014 | Stamler |
| 2014/0012640 A1 | 1/2014 | Roberts et al. |
| 2014/0039717 A1 | 2/2014 | Henkel |
| 2014/0052482 A1 | 2/2014 | Le Marier et al. |
| 2014/0067244 A1 | 3/2014 | Baker et al. |
| 2014/0075506 A1 | 3/2014 | Davis et al. |
| 2014/0123315 A1 | 5/2014 | Baker et al. |
| 2014/0188311 A1 | 7/2014 | Masson |

FOREIGN PATENT DOCUMENTS

| | | |
|---|---|---|
| EP | 1318463 A1 | 6/2003 |
| EP | 1454306 A2 | 9/2004 |
| EP | 1 610 094 A1 | 12/2005 |
| EP | 1679624 A2 | 7/2006 |
| EP | 1874001 B1 | 1/2008 |
| EP | 2088543 A1 | 8/2009 |
| EP | 2088569 A1 | 8/2009 |
| EP | 2222053 A1 | 8/2010 |
| EP | 2290600 A2 | 3/2011 |
| EP | 2362354 A2 | 8/2011 |
| EP | 2390845 A1 | 11/2011 |
| EP | 2474931 A1 | 7/2012 |
| GB | 2366945 A | 3/2002 |
| GB | 2408131 B | 3/2006 |
| GB | 2418511 A | 3/2006 |
| GB | 2469026 A | 10/2010 |
| GB | 2470897 A | 12/2010 |
| JP | 2005135199 A | 5/2005 |
| JP | 2006053724 A | 2/2006 |
| JP | 2008117340 A | 5/2008 |
| JP | 2008171181 A | 7/2008 |
| JP | 2009093603 A | 4/2009 |
| WO | 0073954 A2 | 12/2000 |
| WO | 0135269 A2 | 5/2001 |
| WO | 0135289 A1 | 5/2001 |
| WO | 0157323 A1 | 8/2001 |
| WO | 0215582 A1 | 2/2002 |
| WO | 03005237 A1 | 1/2003 |
| WO | 2004045106 A1 | 5/2004 |
| WO | 2006010774 A1 | 2/2006 |
| WO | 2008055181 A2 | 5/2008 |
| WO | 2009002139 A1 | 12/2008 |
| WO | 2009021068 A1 | 2/2009 |
| WO | 2009058505 A1 | 5/2009 |
| WO | 2009091553 A1 | 7/2009 |
| WO | 2011057323 A1 | 5/2011 |
| WO | 2011088233 A1 | 7/2011 |
| WO | 2012105829 A2 | 8/2012 |
| WO | 2012106075 A1 | 8/2012 |
| WO | 2013079512 A1 | 6/2013 |

OTHER PUBLICATIONS

Aircom Server User Guide, SITA Airline Telecommunications and Information Services, Jan. 24, 2013, pp. 1-153.

Chen, et al., "A Survey of Context-Aware Mobile Computing Research", Department of Computer Science, Dartmouth College, pp. 1-16, Hanover, New Hampshire.

Examination Report of Malaysian Patent Application No. 2013001405, received from the Intellectual Property Corporation of Malaysia on Oct. 28, 2014.

Examination Report received in Malaysian Application No. PI 2013000936.

Glushko, et al., Bridging the "Front Stage" and "Back Stage" in Service System Design, Proceedings of the 41st Hawaii International Conference on System Sciences, 2008, pp. 1-10, California.

International Search Report and the Written Opinion mailed in International Application No. PCT/EP2013/052590 filed Aug. 2, 2013.

International Search Report and the Written Opinion mailed in International Application No. PCT/EP2013/057497 filed Oct. 4, 2013.

International Search Report and Written Opinion mailed in International Application No. PCT/EP2011/070551 filed Nov. 21, 2011.

(56) References Cited

OTHER PUBLICATIONS

International Search Report and Written Opinion mailed in International Application No. PCT/EP2014/062464 filed Jun. 13, 2014.
International Search Report and Written Opinion mailed in International Application No. PCT/EP2015/053319 filed Feb. 17, 2015.
International Search Report mailed in International Application No. PCT/EP2011/072286 filed on Sep. 12, 2011.
Kindervater, Revenue Management in the Airline Passenger Industry, 2007, pp. 1-24.
Kinneging, Machine Readable Travel Documents—Technical Report, PKI for Machine Readable Travel Documents Offering ICC Read-Only Access, PKI Task Force, International Civil Aviation Organization, Version 1.1, Oct. 1, 2004, pp. 1-58.
Kirby, Personal Services—In-flight connectivity poised to change the passenger experience for ever, http://www.flightglobal.com/news/articles/personal-services-in-flight-connectivity-poised-to-change-the-passenger-experience-for-332765/, Article dated Se.
Kitson, The Future of In-flight: Part Two—The Concierge Concept, http://ustwo.com/blog/the-future-of-in-flight-part-two-the-concierge-concept/, Article dated Apr. 2012.
Li, et al., XVM: A Bridge Between XML Data and Its Behavior, May 17-22, 2004, pp. 1-9, New York.
Machine Readable Travel Documents, Part 1, Machine Readable Passports—vol. 1, Passports with Machine Readable Data Stored in Optical Character Recognition Format, International Civil Aviation Organization, Sixth Edition, 2006, pp. 1-99.
Machine Readable Travel Documents, Part 1, Machine Readable Passports—vol. 2, Specifications for Electronically Enabled Passports with Biometric Identification Capability, International Civil Aviation Organization, Sixth Edition, 2006, pp. 1-131.
Machine Readable Travel Documents, Part 3, Machine Readable Official Travel Documents—vol. 1, MRtds with Machine Readable Data Stored in Optical Character Recognition Text, International Civil Aviation Organization, Third Edition, 2008, pp. 1-122.
Machine Readable Travel Documents, Part 3, Machine Readable Official Travel Documents—vol. 2, Specifications for Electronically Enabled MRtds with Biometric Identification Capability, International Civil Aviation Organization, Third Edition, 2008, page.
Madria, et al., An XML Schema Integration and Query Mechanism System, Science Direct, Data and Knowledge Engineering 65, 2008, pp. 266-303.
Marmasse, et al., Location-aware information delivery with comMotion, MIT Media Laboratory, HUC 2000 Proceedings, 2000, pp. 157-171.
McGuire, et al., The Future of Revenue Management, SAS Global Forum, 2009, pp. 1-5.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-.
Russian Search Report for 2013133853/08(050668) mailed Feb. 20, 2015.
Schechner, Airlines Entertain Tablet Ideas—Rather Than Wiring Planes for In-Flight Movies, Some Hand Out iPads, http://online.wsj.com/articles/SB10000872396390443916104578020601759253578, Article dated Sep. 2012.
Schwinger, et al., Context-Awareness in Mobile Tourism Guides—A Comprehensive Survey, 2002, pp. 1-20.
Search Report and Examination Opinion mailed in International Application No. GB1421313.6.
Search Report and Written Opinion mailed in International Singapore Application No. 201306353-2, mailed on Apr. 11, 2014, by the Danish Patent and Trademark Office.
Search Report and Written Opinion of Singapore Application No. 201301980-7, dated Sep. 3, 2013.
Smith, et al., Yield Management at American Airlines, American Airline Decision Technologies, 1992, pp. 8-31.
Susan Stellin, "Automation Is Considered for Checking IDs in Airports", Business Day, The New York Times, Mar. 19, 2012, 3 pages, retrieved Sep. 4, 2014, http://www.nytimes.com/2012/03/20/business/tsa-is-considering-automating-id-checks.html.
Written Opinion mailed in Singapore Application No. 201301978-1, dated Oct. 15, 2013.
Xu, et al., A Model of Capacity Control with Overbooking for a Two-leg Airlines Network, IEEE 2008, pp. 1-5.
Dunkel, et al., Model-Driven Architecture for Mobile Applications, 2007, pp. 464-477, Hanover, Germany.
Johnston, et al., Multimodal Applications from Mobile to Kiosk, pp. 1-4.
Munoz, et al., Context-Aware Mobile Communication in Hospitals, IEEE Computer Society, 2003, pp. 38-46.
Belobaba, Fundamentals of Pricing and Revenue Management, The Global Airline Industry, 2009.
Caliendo, et al., Social Networks, Job Search Methods and Reservation Wages: Evidence for Germany, IZA, Sep. 2010, Germany.
Glaser-Opitz, et al., Evaluation of CPDLC and Voice Communication During Approach Phase, Digital Avionics Conference, Sep. 13-17, 2015.
Hull, et al., Technology-Enabled Airborne Spacing and Merging, Digital Avionics Systems Conference, 2004.
International Examination Report mailed in Australian Application No. 2011347893 dated Sep. 11, 2015.
International Search Report and Written Opinion mailed in International Application No. PCT/EP2014/055037 filed Mar. 13, 2014.
International Search Report and Written Opinion mailed in International Application PCT/EP2015/068682 dated Oct. 29, 2015.
International Search Report and Written Opinion mailed in Singapore Application No. 11201404575U dated Jun. 16, 2015.
Kenney, et al., Secure ATC Surveillance for Military Applications, Military Communications Conference, 2008.
Lee, et al., Effectiveness of the Ground-Based Transceiver (GBT) Parrot System for Monitoring GPS Integrity for Alaska ATC "Radar-Like Services" Using ADS-B, Digital Avionics Systems Conference, 2004.
Search Report and Written Opinion mailed Apr. 2, 2014 in GB Application No. 1317659.9.

\* cited by examiner

Passport/passeport  Eire / Ireland / Irlande

Type/Type   Country code/Code de pays   Passport No./N° de passeport
P           IRL                         PC1234567
Surname / Nom
SMITH
Given Names / Prenoms
JOHN XXXX
Nationality / Nationalte              Date of birth / Date de naissance
EIREANNA/IRISH                        13 MAR/MAR 1979
Sex / Sexe        Place of birth / Lieu de naissance
M                 GBR
Date of issue / Date de dellivance    Date of expiry / Date de d'expiration
15 NOV/DEC 2009                       15 NOV/DEC 2017
Holder's signature / Signature du titulaire

*Signature*

P<IRLSMITH<<<<JOHN<<<<XXXX<<<<<<<<<<<<<<
PC12345670IRL7903130M1711157<<<<<<<<<<<<<<4

FIG. 1

Home: > Check In

Checking in: SMITH/JOHN
24-Jan-2012
Kuala Lumpur to Perang
MH1140 10:35-11:25
Seat: (Select)
Send boarding pass to:
Mobile [+33] [123456789]
Email* [inventor@email.com]
Enrich No MH [          ]

☐ I comply with the dangerous goods requirements for baggage.

[Confirm]

*FIG. 3a*

Home: > Passport

Number [PC123456789]
Date of Birth [13] [3] [1979]
Expiry Date [15] [12] [2017]

☐ Details are as in passport

[Confirm]

*FIG. 3b*

| SITA Labs - Security Checkpoint | |
|---|---|
| Passenger Name | SMITH/JOHN |
| Airline | MH |
| Flight Number | 1140 |
| Departure Date | 24Jan |
| Departure City | KUL |
| Arrival City | PEN |
| Seat Number | 001D |
| Class | F |
| Frequent Flyer | MH |
| E-ticket | 2322274421 |
| Boarding Time | 10:05 Gate Not Assigned |
| Document Number | PC123456789 |
| Date of Birth | 13/03/1979 |
| Date of Expiry | 15/11/2017 |
| Approve | Deny |

*FIG. 4*

AIRPORT SECURITY CHECK SYSTEM AND METHOD THEREFOR

CROSS REFERENCE TO RELATED APPLICATIONS

This application is a continuation and claims the benefit of and priority under U.S.C. §§120 to U.S. patent application No. 13/829,185, entitled "AIRPORT SECURITY CHECK SYSTEM AND METHOD THEREFOR", by Michael John Gormley, et al., filed on Mar. 14, 2013, and under 35 U.S.C. §119, to Great Britain Patent Application No. 1221469.8, filed Nov. 28, 2012, entitled "Airport Security Check System and Method Therefor", by Michael John Gormley, et al., and under 35 U.S.C. §§119, 120 to U.S Provisional Patent Application No. 61/622,213, filed Apr. 10, 2012, entitled "Airport Security Check System and Method Therefor", all of which are incorporated herein by reference in their entireties.

FIELD OF THE INVENTION

This invention relates in general to a security system. More particularly, this invention relates to a security system for passengers who are required to have a passport, official travel document or other identity document certifying the passenger's identity in order to travel to their destination. More specifically, this invention relates to a security system for streamlining or expediting passenger processing through security at an airport as well as to a system for decrypting user information stored on a storage device.

BACKGROUND OF THE INVENTION

Many passports are now embedded with a radio frequency identification (RFID) chip which allows biometric and other data to be stored on the passport using the chip. Data may be wirelessly read from the chip using electromagnetic fields generated by a reader. The chip responds by transmitting data via an electromagnetic field coil associated with the chip.

Biometric passports are equipped with protection mechanisms to avoid and/or detect attacks. Biometric passports and chip characteristics are documented in the International Civil Aviation Civil Organization's (ICAO) Doc 9303. Most biometric passports at a minimum support Basic Access Control (BAC), which is mandatory in Europe. BAC protects the communication channel between the chip on or within the passport and the reader by encrypting transmitted information. Usually, data is stored on the passport in an encrypted or secured form which is accessible using a key. This prevents unauthorised users from skimming i.e. unauthorised reading of the data stored in the chip. Furthermore, an eavesdropper cannot eavesdrop information being transferred without knowing the correct key if the passport supports BAC.

Typically, at some point prior to a passenger's departure on a flight, a security check is performed to verify that a passenger's name on a boarding pass matches the name on their passport. The information stored on the chip, such as biometric information, may be used to authenticate the identity of a traveller. A boarding pass is usually a paper document with the passenger's name, flight details, gate and seat number printed on it. Usually, the security check is a visual check performed by a security officer who checks that the passenger name on the boarding pass matches the passenger name on the passenger's passport. The security officer will usually check that the photograph shown on the passport is of the passenger using the passport. As this is a visual check, it is prone to human error.

In some cases, the security check will include reading the biometric data stored on the RFID chip embedded in the passport. However, as the data stored on the chip is encrypted, before data can be read from the passport, the reader needs to provide a key, which may be derived from a Machine Readable Zone (MRZ) located within the passport.

In order to read the data from the MRZ, the passport must be opened and placed on an optical reader, which performs Optical Character Recognition (OCR) on the MRZ. Optical Character Recognition is the mechanical or electronic translation of scanned images of printed text into machine-encoded text.

The reader then derives the key from the data read from the Machine Readable Zone data of the passport. A second RFID scan is then performed which uses the key derived from the OCR to retrieve the biometric data from the passport. This is a two-step process and is prone to error particularly during the OCR part. This is because the OCR part is sensitive to where the passport is placed on the scanner and also may also give an incorrect reading due to dirt on the scanner glass. If an error occurs during the OCR part, then the RFID scan will fail. To recover, the MRZ data has to be manually entered in order to read the biometric data. Because the interpretation of the MRZ is currently done using OCR, only accuracy rates of 80% to 90% can be achieved.

SUMMARY OF THE INVENTION

The invention is defined in the appended claims to which reference should now be made. Embodiments of the invention seek to address the above problems by providing an improved decryption system which eliminates the need for an OCR scan of the Machine Readable Zone. Thus, passport reading is more streamlined and will result in faster throughput of passengers through security. Embodiments of the invention may reduce the time to read a passport by approximately 4 seconds. Embodiments of the invention avoid the need to use optical character recognition software, which typically only has accuracy rates of 80% to 90% on the characters in the Machine Readable Zone. An inaccurate OCR of the MRZ will result in a failure in reading the biometrics from the passport. By having the passenger enter the APIS key data prior to or during check-in and making it available to be electronically read with the boarding pass information, the dependency on OCR is removed. Embodiments of the invention are also less expensive to implement since according to embodiments of the invention, expensive dual OCR/RFID readers may be replaced with lower cost RFID readers.

BRIEF DESCRIPTION OF THE DRAWINGS

An embodiment of the invention will now be described, by way of example only, and with reference to the accompanying drawings, in which:

FIG. 1 shows the front page of a passport including a Machine Readable Zone;

FIG. 3a shows a passenger check-in screen;

FIG. 3b shows a screen where the passenger enters supplementary passport details;

FIG. 4 shows a screen of the data contained within the boarding pass after being read from the mobile communication device;

The following description is of a system for use in the aviation industry, but this is exemplary and other applications of the invention will also be discussed. For example, the security system may be used in any environment where security procedures require a user's identification document and a token for providing a service to the user to be authenticated as belonging to the user before a product or service is provided to the user. Thus, embodiments of the invention have particular application in the travel industry (for example rail, air, coach and the like), but also in the ticketing industry, such as ticketing for theatre, cinema, and the like.

FIG. 1 of the accompanying drawings shows a data page of a passport which is divided into a number of zones. A Visual Inspection Zone, is located in the upper half of the page and contains data not specifically intended to be read by machine. A MRZ of the passport is located in the bottom half of the data page and contains data which is both human readable and machine readable.

The MRZ data may comprise: the document number, the date of expiry, and optionally, the date of birth of the user. Below is an example of the data contained in the MRZ of the passport, although some personal details have been blanked out with an X to protect the owner's identity:
PIRLSMITH<<<<JOHN<<<<
XXXX<<<<<<<<<<<<<<<<<<<
PC12345670IRL7903130M1711157<<<<<<<<<<<<<<<<4

The data within the MRZ may be structured as 2 lines of alphanumeric characters. The data on each line may be separated by one or more filler characters which may be represented by <. Each line of data may be 44 characters in length.

Figure 2:
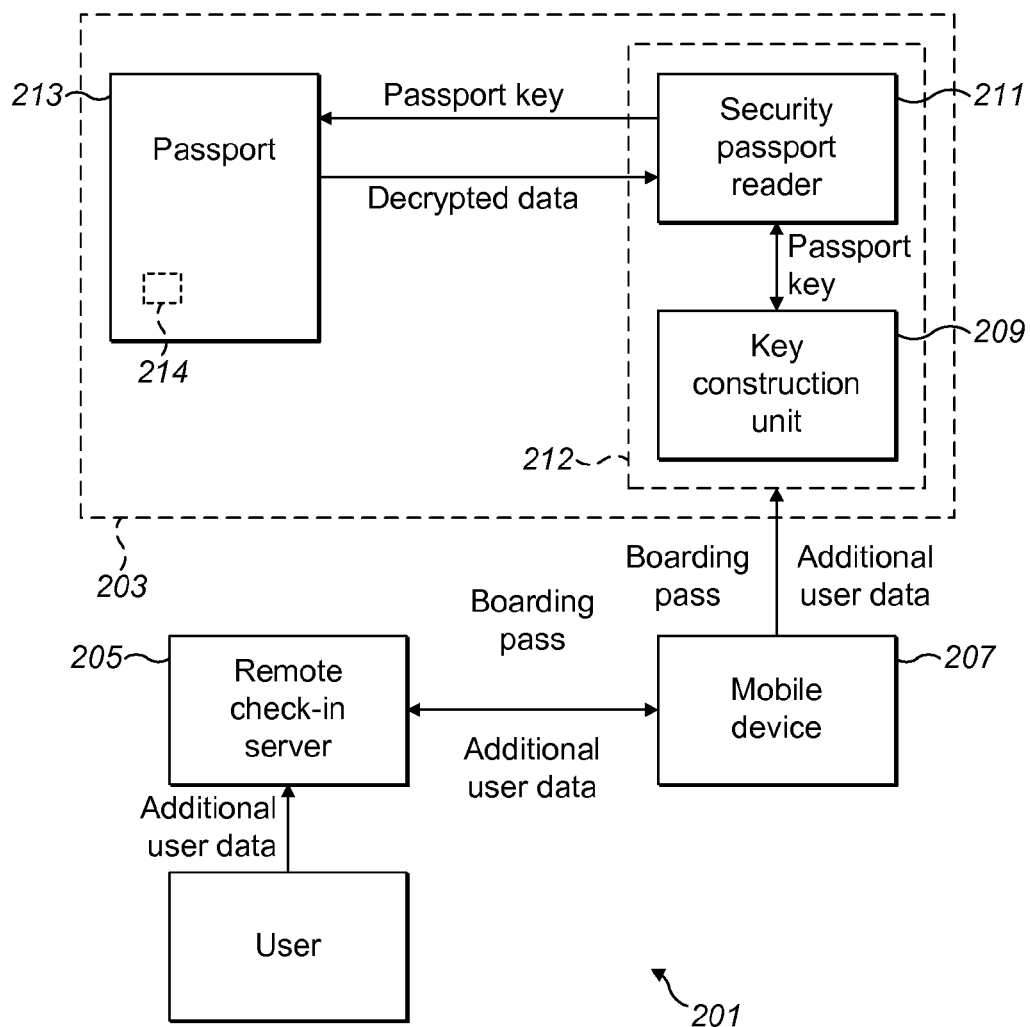
FIG. 2 shows schematic diagram of the main functional components of an embodiment of the invention.

Referring now to FIG. 2, this shows the main functional components of a system 201 embodying the invention. The components shown within the dashed line 203 of FIG. 2 may be located at an airport, although the server 205 does not necessarily need to be located at an airport. The system may comprise a remote check-in server 205 provided by an airline or third party. The remote check-in server 205 is configured to allow a passenger to check-in to a flight for which the passenger has purchased a ticket to travel.

Typically, the passenger remotely accesses the server 205 via a computer or a mobile communication device such as a portable laptop or mobile telephone. However, the user may perform check-in in person at the airport 203 using a check-in desk.

Regardless of how the user performs check-in, associated with each user is a token storage medium such as a portable or mobile device 207 which is capable of storing a boarding pass such as an electronic boarding pass or e-boarding pass. The boarding pass may be thought of as a token which is issued by a service provider to a user which allows the user receive the service in return for payment.

Usually, the server 205 is wirelessly coupled to the user's mobile device 207, for example, using a wireless communications network, but in principle, any communications means, such as a wired network may be used provided the e-boarding pass can be transferred to, and stored on the user's mobile device 207.

Usually, the mobile device 207 comprises a Near Field Communication (NFC) tag or chip communicatively couple to the mobile device. Typically, the NFC enabled integrated circuit or chip is hard wired to the mobile device, but this is in fact optional. However, the mobile device comprises a communication means which allows data to be transferred from the mobile device 207 to a key construction unit 209. The mobile device 207 may be coupled to a wired communication means using for example a Universal Serial Bus (USB) port.

In the embodiment shown in FIG. 2, the key construction unit 209 and the security passport reader 211 are integrally provided on a single unit 212. However, the key construction unit 209 may be provided as a separate component to the security passport reader 211. In either case, the key construction unit 209 is communicatively coupled to a passport or identity card reader 211. The key construction unit 209 may be wirelessly coupled to the reader 211, for example by using WiFi or other wireless radio communication means or via a wired connection.

Operation of the security system 201 will now be described referring to FIGS. 2 to 5 of the drawings. FIGS. 3a and 3b show the process of checking in a passenger and illustrate the typical details which may be collected from a passenger at check-in.

The passenger usually enters their name and optionally a mobile telephone number and email address. This data is usually referred to as Advanced Passenger Information System data (APIS). The passenger usually performs this step at a remote location from the airport 203.

In addition to the information described above which is entered during check-in or collected from the passenger profile at check-in, embodiments of the invention may prompt a user to enter additional passport details that are collected from the passenger. FIG. 3b below illustrates the additional passport details or information that may be collected from a passenger at check-in.

The additional information entered at check-in may comprise one or more of the passport number, date of birth and date of expiry of their passport. The server then incorporates this information into a boarding pass or e-boarding pass, which is delivered to their mobile telephone using wired or wireless communication means known to the skilled person. Usually, the data is encoded as alphanumeric data, but other encoding schemes may be used.

The boarding pass may be represented as a 2D bar code or as an NFC boarding pass. The additional APIS data may be stored in a field for individual airline use which is then encoded as a 2D bar code or as NFC data.

The alphanumeric data in this field may have the following format:

A 9 character Alphanumeric Passport Number. If the passport number is less than 9 characters, then the remaining characters may be padded with the character "<", for example: "ABC123XY<".

A 6 character numeric date of birth in YYMMDD format, for example "720823".

A 6 character numeric date of expiry in YYDDMM format, for example, "210922".

The data is then rendered into a bar coded boarding pass. An NFC boarding pass may have the information in alphanumeric format.

The additional information may be Advanced Passenger Information System (APIS) data. This additional information may comprise one or more of passport or identity card number, date of birth and expiry date of the passport. When entering the information, the passenger may also be invited to tick a check box to indicate that the details entered correspond to those shown in the passport.

Once the passenger has entered these details, the server 205 transmits this information together with the boarding pass, to the mobile telephone or device 207 associated with the passenger. Usually, the additional information entered by the passenger is encoded onto a specific region of the boarding pass as text data or as barcode data or other data. Thus, security passport readers embodying the invention may be configured to read the additional information from the boarding pass by reading data from that specific region. Legacy passport readers, which are not configured to read data from this region of the boarding pass, ignore the additional data.

The mobile telephone or device 207 then stores the additional information and boarding pass as an NFC boarding pass. The boarding pass is stored in a memory such a flash memory or on an integrated circuit memory chip.

In one example, the boarding pass has additional user identity document data or information associated with it which provides further user identity document data or information in addition to the passenger name on the boarding pass.

When the passenger subsequently arrives at the airport, and when a security check is performed on the passenger, the NFC boarding pass together with this passport information is read from their mobile telephone or device 207. In order to read the NFC boarding pass from the mobile device, the passenger swipes their mobile device in close proximity to an NFC reader associated with the key construction unit 209. Usually, the NFC boarding pass is read from the mobile telephone or device 207 using the NFC chip which is communicatively coupled to the mobile telephone or device 207. Thus, the chip may also be communicatively coupled to the storage means associated with the mobile device. Other wired or wireless communication means may be used to transfer the NFC boarding pass from the mobile device 207 to the key construction unit, instead of using near field communications. FIG. 4 of the drawings shows the contents of the boarding pass after being read from the mobile device. The picture shown in FIG. 4 may be displayed on a terminal associated with the reader 211. The data read from the device may comprise one or more of a passenger name, airline, flight number, departure date, departure city, arrival city, seat number, class, frequent flyer number, e-ticket number, boarding time, document number, date of birth, and date of expiry. Although in the picture shown in FIG. 4 all of this data is displayed, this is not essential and one or more of the data fields read from the mobile device may be displayed on the terminal. A security officer may then approve or deny the user's boarding pass by pressing the appropriate field on the terminal marked approve or deny.

The key construction unit 209 then extracts the additional data from the NFC boarding pass by reading the data contained within the specific region of the boarding pass. The data is data encoded on or within the boarding pass.

The key construction unit 209 then reconstructs the key using the additional data. The key construction unit 209 may construct the key using a key derivation mechanism which will be known to the skilled person. The key construction unit 209 then sends or passes the key to the passport security reader 211.

The passenger or security officer then subsequently scans or swipes the passport 213 in close proximity to the reader 211. Thus, the RFID chip or integrated circuit 214 embedded within the passport starts communicating with the reader. These initial communications between the reader and RFID chip may include an authentication step where the reader may be authenticated as being a genuine reader, rather than an unauthorised user attempting to read or skim the data stored on the chip. The reader may authenticate itself using the key constructed by the key construction unit.

If the reader has been authenticated as being genuine, data requested by the reader may then be sent from the chip 214 to the reader 211. Usually, the data is sent to the reader in an encrypted form. This may prevent an eavesdropper intercepting data sent from the chip 214 to the reader 211.

The reader 211 then receives the encrypted data sent from the chip 214 and decrypts the data using the key constructed from the additional data. Other contactless integrated circuits 214 may also be embedded within the passport 213 or other official travel document without departing from the scope of the invention.

Usually, the passport is scanned immediately after the user has swiped their mobile device past the NFC reader associated with the key construction unit. Thus, the key construction unit 209 may only construct the key in response to receiving the additional data from the mobile device 207. In this way, when the security passport reader 211 receives a key from the key construction unit 209, the reader 211 is thus primed with a key which allows data to be decrypted on a subsequently scanned RFID chip 213 associated with the passport 213. The reader 211 may construct different keys for authentication and encryption or decryption.

The encrypted data stored on the RFID chip 211 may be biometric data such as iris recognition data, facial recognition data, and fingerprint recognition data, however in principle, any data may be stored on the chip or other wireless storage means or device associated with the passport. Thus, any data may be decrypted and read from the chip. However in a preferred embodiment, the reader 211 reads a user's surname and name from the chip.

The reader 211 may then compare the information read from the encrypted data on the RFID chip 214 with the data on the boarding pass. If the decrypted information read from the chip 214 matches corresponding information read from the user's boarding pass, then the user may be deemed to have passed the security check. Thus, this avoids the need for a second scan of the passport 213. This is beneficial since an extra scan of the passport 213 can be avoided, thereby reducing OCR reading errors and speeding up passenger processing through security.

Figure 5:
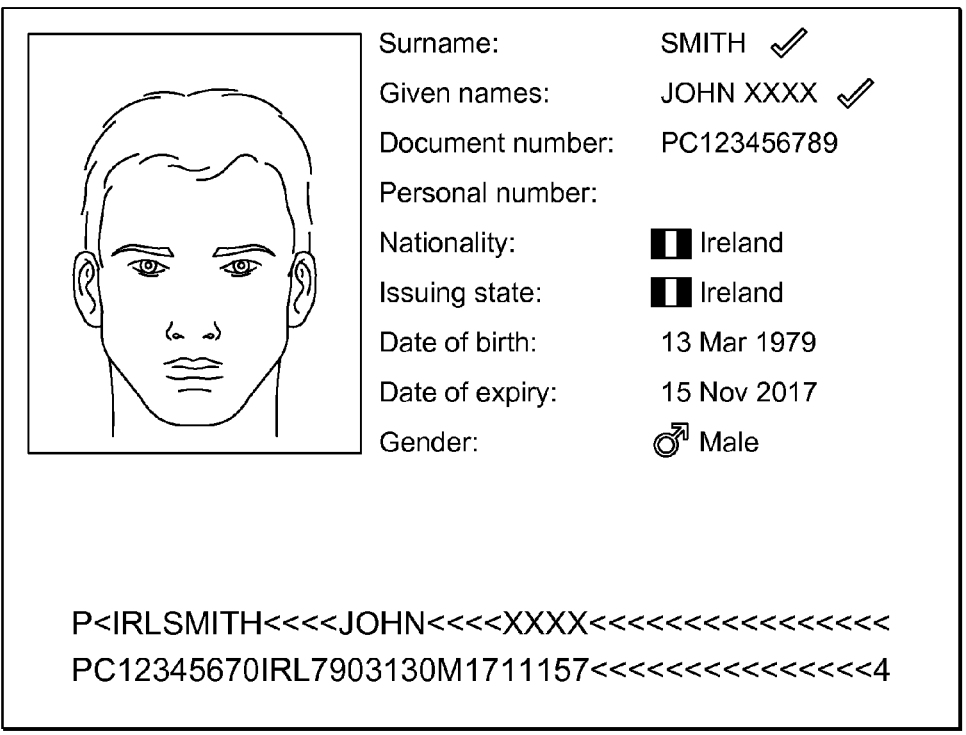
FIG. 5 shows the identification data read from the mobile communication device.
Figure 6:
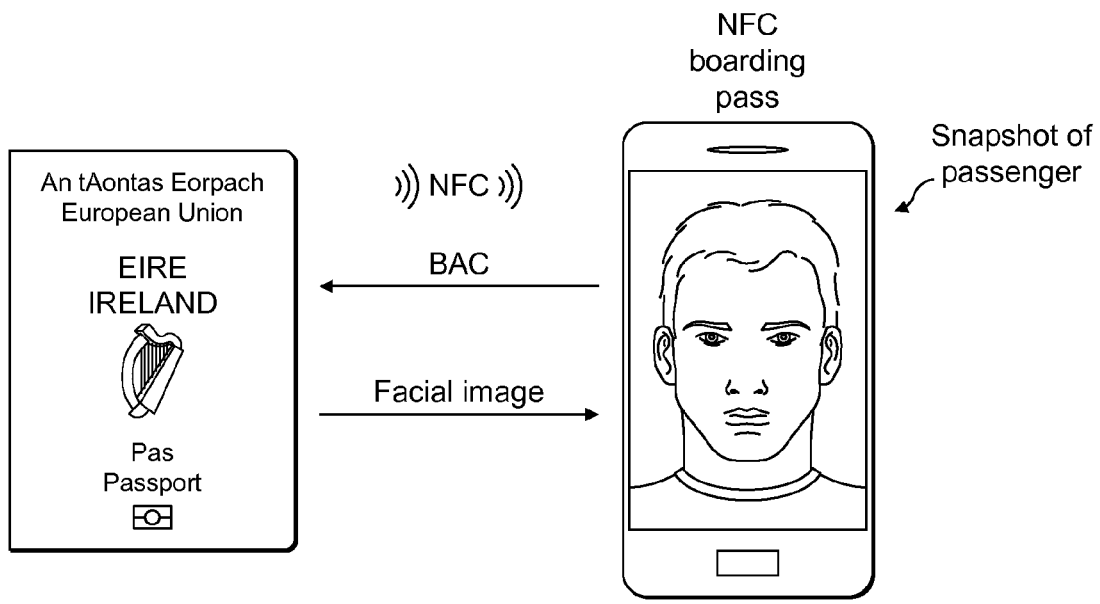
FIG. 6 is a schematic diagram showing a further embodiment which compares a biometric facial image read from a passport to an image of the passenger captured with a camera.
Figure 7:
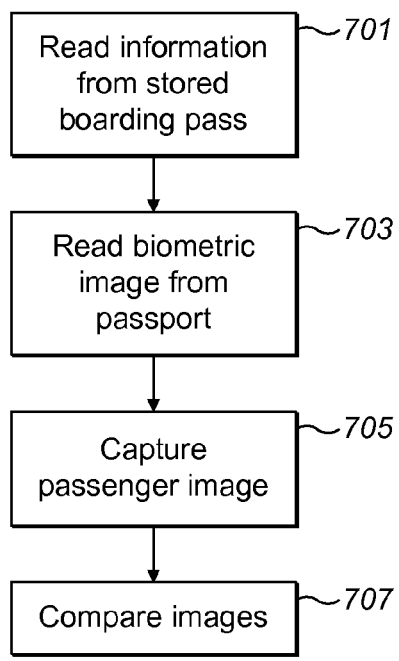
FIG. 7 shows the main steps performed by the embodiment of FIG. 6.

FIG. 5 shows a picture displayed on a terminal associated with the reader 211 which displays the details read from the passport 213 such as the user identification information. As shown in FIG. 5, the information may comprise one or more of the user's surname, name, document number, personal number, nationality, passport issuing state, date of birth, date of passport expiry, and gender may be read from the RFID chip. Data associated with a passenger's picture may also be read from the chip. The data contained within the machine readable zone may also be displayed on the terminal.

Also shown in FIG. 5 is a visual indication of the results of the comparison of the data read from the chip and the data encoded onto the boarding pass, such as the name on the boarding pass and the name read from the passport. In FIG. 5, the surname and given name have a check mark next to each of them. This indicates that both the surname and name on the passport 213 match the name on the boarding pass. This avoids the need for a human visual check of the boarding pass and passport 213, thereby improving accuracy and speeding up check in time.

As outlined above, with the introduction of NFC boarding passes, a boarding pass may be sent directly to a passenger's mobile telephone and may be read using an NFC/RFID scanner. New supplementary (APIS) passenger passport data, such as passport number, date of birth and date of expiry may be requested from the passenger at the time of check-in. This supplementary information may then be passed with the NFC boarding pass to the passenger's mobile telephone. When the NFC boarding pass is read at security, the supplementary passport information is then used to derive the key for access to the passport biometric data. Having this supplementary passport information eliminates the need to do an OCR scan of the passport details. Simply placing the passport close to the RFID scanner even when the passport is closed will result in the biometric information being read from the passport.

Although the present invention has been described with reference to a mobile device 207 such as a portable telephone which stores the e-boarding pass, the mobile device 207 is in fact optional. In some embodiments, after the user has performed remote check-in with server 205, a paper boarding pass may also be printed by the user or at another location alternatively or in addition to the generation and storage of the NFC boarding pass. Thus, embodiments of the invention may also be configured such that the server 205 generates a boarding pass including the additional information which is physically printed on the boarding pass to encode the additional information on the paper boarding pass. The user may print the boarding pass using a standard printer, which has the additional information encoded on it within a specific region of the boarding pass. Thus, it is not essential in all embodiments for the electronic boarding pass to be sent to a user's electronic device provided a token storage medium is provided.

Further, some offices issuing official travel documents also require that the travel document is provided with a Faraday cage protecting a RFID chip within the cage from electro-magnetic waves. To access the chip protected within the cage, the official travel document must be opened prior to reading and thus, this provides an extra layer of security to prevent unauthorised reading of data from the RFID chip.

Preferably, the reading or NFC/RFID scanning is performed by a mobile telephone or other mobile or portable reader or scanner.

In some embodiments, the passport may be pre-stored on the mobile telephone. The passport may be stored in a secured or unsecured manner in the mobile telephone or other portable communication device. Thus, in some embodiments, the passport information is provided by a mobile telephone. Further, the security check matching may occur when the travel document such as the boarding pass is sent, or when checking-in.

In a further example, in addition to the security check which is performed to verify that a passenger name on a boarding pass matches the name on their passport, the photo in the passport may be checked against the passenger for a match. Embodiments of the invention may fully automate this check by comparing the passport facial biometric image also known as the reference image with the actual image of the passenger trying to board the flight. This may involve taking a photo of the passenger and automatically executing a facial recognition algorithm to compare it to the passport reference image.

In this example, embodiments of the invention may perform the following steps:

1. When a passenger checks in to a flight the minimum BAC information is collected i.e. passport number, date of birth and date of expiry. The boarding pass information together with the BAC information is transmitted and stored on the passengers' mobile telephone as an NFC boarding pass. The may be performed by placing the telephone on the passport. The telephone may then read the BAC information from the current boarding pass stored on the telephone, at step 701.

2. Typically a security check is done to authenticate the identity of the traveller. An NFC enabled telephone e.g. Samsung S3 or desktop reader may be used to read the NFC boarding pass stored on the passengers phone. As previously described, using the BAC details from the NFC boarding pass, the passengers' passport may also be read by an NFC enabled telephone or desktop reader at security. BAC provides access to the passengers' passport details and more importantly to the facial biometric image of the passenger. This may be performed by reading passport biometric facial image using the BAC information, at step 703, preferably saving the image on the phone. The passport details may then be automatically compared with the details in the NFC boarding pass e.g. first name and last name. In addition to this, the passenger or security officer may take the passenger picture using a front facing camera on using a telephone or other camera. The passenger may pose for a snapshot using a front facing camera on a phone, at step 705. After the picture is taken, a facial recognition algorithm may be used to automatically compare the picture to the passport facial biometric image. The algorithm compares the passport biometric facial image with the snapshot, at step 707.

The following numbered clauses are hereby included to give further description of the invention:

1. A decryption system for decrypting user information encrypted on a storage device associated with a user identity document, the system comprising:
    a server configured to collect user identity document data from the or a user and to construct a token comprising the user identity document data;
    a key construction unit communicatively coupled to a reader configured to read the data from the token;
    wherein the key construction unit uses the user identity document data read from the token to construct a key which enables the or a reader to decrypt the user information stored on the storage device.

2. A decryption system according to clause 1 wherein the key construction unit derives the key based on one or more of a user identity document number, an expiry date of the user identity document and preferably a user's date of birth.

3. A decryption system according to clause 1 wherein the or a user manually enters the user identity document data prior to the reader reading the data encoded on the token.

4. A decryption system according to clause 1 in which the reader is configured to read the user information stored on the storage device.

5. A decryption system according to clause 1 in which the token further comprises user identification information and in particular in which the reader is further configured to read the user identification information from the token.

6. A decryption system according to clause 5 further comprising a comparator for comparing the user identification information read from the token and the user information decrypted from the storage device associated with the user identity document.

7. A decryption system according to clause 5 further comprising a comparator for comparing the user identification information read from the token and the user information decrypted from the storage device associated with the user identity document and further comprising authentication means for authenticating the user depending upon the result of the comparison.

8. A decryption system according to clause 1 further comprising a mobile device associated with a user for storing the token.

9. A decryption system according to clause 1 in which the token is a boarding pass having the user identity document data encoded in a specific region of the boarding pass.

10. A decryption system according to clause 1 further comprising a mobile device associated with a user for storing the token, wherein the mobile device comprises a near field communication, NFC, chip communicatively coupled with the mobile device for transmitting the token to the reader such as an airport check-in security desk.

11. A decryption system according to clause 1 in which the key construction unit is configured to construct the key in response to the reader reading the user identity document data encoded in machine readable form on or within the token.

12. A decryption system according to clause 1 in which the identity document reader is primed to decrypt the user identification information encrypted on or within the storage device in response to the reader reading the user identity document data from the token.

13. A decryption system according to clause 1 in which the reader is a wireless reading means preferably comprising a near field communication, NFC, reading means configured to communicate with a mobile device for storing the token storage device and further preferably comprising a radio frequency identification, RFID, reading means configured to communicate with the storage device.

14. A boarding pass for use with the decryption system of clause 1, the pass comprising:
  user identity document data associated with a user identity document, the data encoded in a machine readable form wherein the data is encoded on or within a predetermined region of the token and the data comprises a user identity document number and an expiry date of the user identity document and preferably the user's date of birth.

15. A token generating system for generating a boarding pass and the like comprising:
  a server configured to collect user identity document data from a user and to construct a token such as a boarding pass including the user identity document data encoded in a machine readable form wherein the server is configured to generate the token having the data encoded on or within a predetermined region and the data comprises a user identity document number and an expiry date of the user identity document and preferably the user's date of birth.

16. A decryption system for decrypting user information encrypted on a storage
  device associated with a user identity document, the system comprising:
  a reader configured to read data from a token such as a boarding pass and the like, the token including user identity document data encoded in a machine readable form, the reader configured to read the data encoded on the storage device; and
  a key construction unit configured to derives a key from the user identity document data encoded on or within the token which enables the reader to decrypt the user information stored on the storage device.

17. A decryption system according to clause 16 in which the reader is configured to read the user identity document data from a predetermined region of the token.

18. A decryption method for decrypting user information encrypted on a storage device associated with a user identity document, comprising the steps of:
  collecting, using a server, user identity document data from the or a user;
  constructing a token including the user identity document data encoded in a machine readable form;
  reading, using a reader, the data from the token;
  constructing, using a key construction unit, a key with the user identity document data read from the token, wherein the key enables the identity document reader to decrypt the user information stored on the storage device; and
  preferably reading, using the reader, the information from the storage device.

19. A decryption method according to clause 1 wherein the key construction unit derives the key based on one or more of a user identity document number, an expiry date of the user identity document and preferably a user's date of birth.

20. A decryption method according to clause 1 wherein the or a user manually enters the user identity document data prior to reading the data encoded on the token.

21. A decryption method according to clause 1 further comprising the step of reading the user information stored on the storage device.

22. A decryption method according to clause 1 in which the token further comprises user identification information and in particular comprising the step of reading the user identification information from the token.

23. A decryption method according to clause 1 in which the token further comprises user identification information and in particular comprising the step of reading the user identification information from the token and further comprising the step of comparing the user identification information read from the token and the user information decrypted from the storage device associated with the user identity document.

24. A decryption method according to clause 1 in which the token further comprises user identification information and in particular comprising the step of reading the user identification information from the token and further comprising the step of comparing the user identification information read from the token and the user information decrypted from the storage device associated with the user identity document and authenticating the user depending upon the result of the comparison.

25. A decryption method according to clause 1 further comprising a mobile device associated with a user for storing the token.

26. A decryption method according to clause 1 in which the token is a boarding pass further comprising the step of encoding the user identity document data in a predetermined region of the boarding pass.

27. A decryption method according to clause 1 further comprising a mobile device associated with a user for storing the token, wherein the mobile device comprises a near field communication, NFC, chip communicatively coupled with the mobile device for transmitting the token to the reader such as an airport check-in security desk.

28. A decryption method according to clause 1 further comprising the step of constructing the key in response to reading the user identity document data encoded in machine readable form on or within the token.

29. A decryption method according to clause 1 in which the identity document reader is primed to decrypt the user information encrypted on the storage device in response to reading the user identity document data from the token.

30. A decryption method according to clause 1 in which the reader is a wireless reading means preferably comprising a near field communication, NFC, reading means configured to communicate with a mobile device for storing the token storage device and further preferably comprising a radio frequency identification, RFID, further comprising the step of communicating with the storage device.

31. A token generating method for generating a boarding pass and the like comprising the steps of:
collecting, using a server, user identity document data from a user;
constructing, using a key construction unit, a token such as a boarding pass including the user identity document data encoded in a machine readable form; and
generating, using the or a server, the token having the data encoded on or within a predetermined region wherein the data comprises a user identity document number and an expiry date of the user identity document and preferably the user's date of birth.

32. A decryption method for decrypting user information encrypted on a storage device associated with a user identity document, the method comprising the steps of:
reading, using a reader, data from a token such as a boarding pass and the like, the token including user identity document data encoded in a machine readable form;
deriving, using a key construction unit, a key from the user identity document data encoded on or within the token; and
decrypting the user information stored on the storage device using the derived key.

33. A decryption method according to clause 1 in further comprising the step of reading the user identity document data from a predetermined region of the token and preferably in which the reader reads the data encoded on the storage device.

34. A computer program product which when executed undertakes the method of clause 1.

35. A decryption system for decrypting user information encrypted on a storage device associated with a user identity document, the system comprising:
a server configured to collect user identity document data from the or a user and to construct a token comprising the user identity document data;
a reader configured to read the data from the token wherein the reader uses the user identity document data read from the token to decrypt the user information stored on the storage device.

36. A decryption system according to clause 35 wherein the reader is a portable reader or scanner such as a mobile telephone.

37. A decryption system according to clause 35 in which the user identity document is a passport and preferably in which the user identity document or passport is pre-stored on a mobile communication device, preferably in a secured manner.

38. The decryption system according to any one of clauses 1 to 17 further comprising the step of reading a user identity document biometric facial image using the key 39. The decryption system according to any one of clauses 1 to 17 or 38 further comprising the step of capturing an image of the user with a camera and preferably comparing the captured image with the passport biometric facial image read from the user identity document.

The invention claimed is:

1. A decryption system for decrypting user information encrypted on a storage device associated with an identity document of a user, the system comprising:
a server configured to collect user identity document data from the user and to construct a token comprising the user identity document data;
a mobile device comprising a reader configured to read the user identity document data from the token by radio frequency identification communication, wherein the reader uses the user identity document data read from the token to decrypt the user information stored on said storage device and wherein the reader is further configured to read, by radio frequency identification communication, a user identity document biometric facial image from said storage device using the user identity document data;
a camera configured to capture an image of the user's face;
a comparator configured to compare the captured image of the user's face with the user identity document biometric facial image read from the user identity document; and
authentication means for authenticating the user depending upon the result of the comparison.

2. The decryption system according to claim 1 wherein the reader is a portable reader or scanner.

3. The decryption system according to claim 1 in which the user identity document is a passport.

4. The decryption system according to claim 1 in which the user identity document is pre-stored on a mobile communication device.

5. The decryption system according to claim 4 in which the user identity document is pre-stored on a mobile communication device in a secured manner.

6. The decryption system according to claim 1 wherein the user identity document data comprises one or more of a user identity document number, an expiry date of the user identity document and a date of birth of the user.

7. The decryption system according to claim 1 wherein the token is a boarding pass.

8. The decryption system according to claim 7 wherein the boarding pass is a Near Field Communication boarding pass.

9. The decryption system according to claim 1, wherein the mobile device further comprises a Near Field Communication enabled telephone comprising the reader.

10. The decryption system according to claim 1 wherein the comparator is configured to use a facial recognition algorithm to compare the captured image of the user's face with the user identity document biometric facial image read from the user identity document.

11. A method for decrypting user information encrypted on a storage device associated with an identity document of a user, the method comprising:
collecting, at a server, user identity document data from the user;
constructing, at the server, a token comprising the user identity document data;
reading, at a mobile device comprising a reader, the user identity document data from the token by radio frequency identification communication, using the user identity document data read from the token to decrypt the user information stored on said storage device and reading, by radio frequency identification communication, a user identity document biometric facial image from said storage device using the user identity document data;

capturing, at a camera, an image of the user's face;

comparing, at a comparator, the captured image of the user's face with the user identity document biometric facial image read from the user identity document; and authenticating, at an authentication means, the user depending upon the result of the comparison.

12. The method according to claim 11 wherein the reader is a portable reader or scanner.

13. The method according to claim 11 in which the user identity document is a passport.

14. The method according to claim 11 in which the user identity document is pre-stored on a mobile communication device.

15. The method according to claim 14 in which the user identity document is pre-stored on a mobile communication device in a secured manner.

16. The method according to claim 11 wherein reading the user identity document data from the token comprises reading one or more of a user identity document number, an expiry date of the user identity document and a date of birth of the user.

17. The method according to claim 11 wherein constructing the token comprises constructing a boarding pass.

18. The method according to claim 17 wherein the boarding pass is a Near Field Communication boarding pass.

19. The method according to claim 11 wherein the capturing step is performed by the mobile device and the mobile device further comprises a Near Field Communication enabled telephone.

20. The method according to claim 11 wherein the comparator is configured to use a facial recognition algorithm to compare the captured image of the user's face with the user identity document biometric facial image read from the user identity document.

* * * * *